Aug. 5, 1947.  R. W. LUCE  2,425,104
THREADED LOCKING DEVICE AND METHOD OF MAKING SAME
Filed Dec. 30, 1942

INVENTOR
RICHARD W. LUCE
BY
George F. Gill
ATTORNEY

Patented Aug. 5, 1947

2,425,104

UNITED STATES PATENT OFFICE 2,425,104

THREADED LOCKING DEVICE AND METHOD OF MAKING SAME

Richard W. Luce, Southport, Conn.

Application December 30, 1942, Serial No. 470,589

3 Claims. (Cl. 151—7)

1

The invention herein disclosed relates to a threaded locking device of the kind in which an elastic medium is utilized to effect a locking action between the thread of the device and the thread of a bolt entered therein.

Threaded locking devices of the kind mentioned as heretofore made consist of a threaded metallic element or section and a non-metallic, fibrous, elastic washer secured to one end of the threaded element. Generally, the fibrous washer is held in place by an inturned flange either formed integral with the nut or as a part of a metallic case enclosing the threaded metallic element and the washer.

An object of the present invention is to provide a threaded locking device of this kind that is simpler in construction and that is inexpensive to manufacture. Another object of the invention is to provide a threaded locking device of this kind in which an enclosing flange is not required to secure the non-metallic, elastic washer to the threaded metallic element. A further object of the invention is to provide a threaded locking device of this kind in which the elastic washer forms a part of a case surrounding the threaded element.

Figure 1:
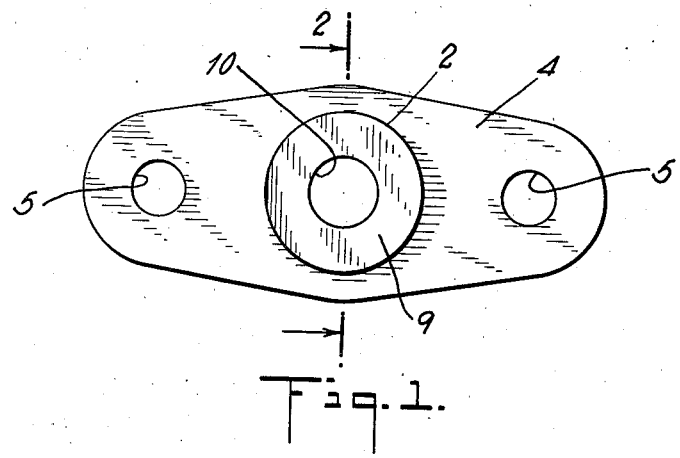
Figure 2:
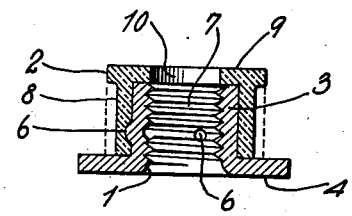
Figure 3:
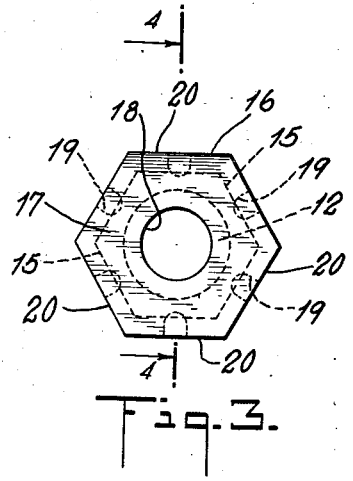
Figure 4:
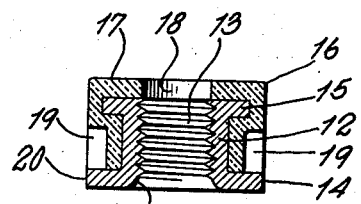

These objects and certain advantages that will hereinafter appear are realized in the specific embodiments of the invention illustrated in the accompanying drawing and described in detail below. The drawings include:

Fig. 1 which is a plan of an anchor nut constructed in accordance with this invention;

Fig. 2 which is a sectional elevation of the same taken on the line 2—2 of Fig. 1;

Fig. 3 which is a plan of a hex nut constructed in acordance with this invention; and Fig. 4 which is a sectional elevation of the same taken on the line 4—4 of Fig. 3.

The threaded locking device illustrated in Figs. 1 and 2 of the drawings is an anchor nut which is adapted to be secured to one of two plates or like structural elements to be secured together by a nut and bolt. The particular anchor nut illustrated consists of a metallic element denoted generally by the numeral 1 and a non-metallic element denoted generally by the numeral 2. The metallic element is stamped from sheet metal and includes a hollow boss 3 having a flange 4 extending outwardly from one end thereof and of somewhat elliptical shape. This flange is provided with openings 5 through which rivets may extend for securing the flange to a plate, for example.

A series of outwardly extending detents 6 are

2 formed in the boss 3. These are equally spaced angularly about the axis of the boss. The boss is tapped to form the thread 7 therein and the axis of the boss is perpendicular to the plane of the flange which forms the face of the nut.

The non-metallic element 2 is molded from thermo-plastic material preferably one having some elasticity, such, for example as "Lucite." In the first instance it is molded in the form of a cup and includes a cylindrical portion 8 and an end wall 9 having an opening 10 therethrough of a diameter less than the root or major diameter of the thread 7 and greater than the minor diameter of the thread 7. In its initial form, the cylindrical portion had an internal diameter such as to pass over the detents 6. The element 2 so made is placed over the boss 3 and thereafter partly reformed.

After the element is placed over the boss, it is placed in a press having radial moving tools which heat the side wall of the element 2 and press it inwardly when plastic. This causes the thermo-plastic material to form around the detents. Thus, the elements 1 and 2 have interengaging means, the detents 6 and the complementary recesses in the element 2, which restrain relative axial and rotative movement between the elements 1 and 2.

A thermo-plastic material has certain advantages as the elastic element over the ordinary fiber heretofore used. The fiber is hygroscopic and absorbs moisture. This moisture injures the fiber in its ability to perform its intended function. The thermo-plastic material is not hygroscopic.

In Figs. 3 and 4 of the drawings there is disclosed a hex nut of like construction. In this nut the metallic element, denoted generally by the numeral 11, includes a hollow boss 12 having a thread 13 formed therein. At one end of the boss, there is an outwardly extending flange 14 that forms the face of the nut. At the opposite end of the boss, there is another outwardly extending flange 15, preferably hexagonal.

The non-metallic element, denoted generally by the numeral 16 is formed of thermo-plastic material. Initially, this element is molded as a hexagonal cup-shaped member including an end wall 17 having an opening 18 therethrough of a diameter less than the root or major diameter of the thread 13 and greater than the minor diameter of the thread. This element 16 is placed over the element 11 with the end wall thereof engaging the flange 15 and the edge engaging the flange 14. Then, radial tools form depressions 19 in the flats 20 of the element 16 which engage the flange 15. Thus, the flange and the recesses in which it is received restrain relative axial and rotative movement between the elements 11 and 16.

It will be obvious that various changes may be made by those skilled in the art in the modifications illustrated in the drawings and described in detail above within the principle and scope of the invention as expressed in the appended claims.

I claim:

1. The method of making a threaded locking device of the kind in which a non-metallic, elastic medium is utilized to effect the locking action, which method includes the steps of forming a hollow metallic element, internally threading the element, molding from thermo-plastic material an encasing element for the metallic element with an end wall having an opening therethrough of lesser diameter than the major diameter of the thread and of greater diameter than the minor diameter of the thread, placing the case over the metallic element, and thereafter partially reforming the case through the application of heat and pressure.

2. The method of making a threaded locking device of the kind in which a non-metallic, elastic medium is utilized to effect the locking action, which method includes the steps of forming a hollow, metallic element having an outwardly extending projection, internally threading the element, molding from thermo-plastic material an encasing element for the metallic element with an end wall having an opening therethrough of lesser diameter than the major diameter of the thread and of greater diameter than the minor diameter of the thread, placing the case over the metallic element and thereafter partially reforming the encasing element by the application of heat and pressure to effect an engagement with the outward projection of the metallic element.

3. A threaded locking device of the kind in which an elastic medium is utilized to effect the locking action, which threaded locking device comprises in combination a metallic, internally threaded element having an end surface constituting the face of the threaded locking device, and an elastic, non-metallic, moldable element surrounding the metallic element and extending over the edge thereof opposite to the end surface constituting the face of the nut and having an opening therethrough of a diameter such as to engage the thread of a screw entered through the metallic element, and a hexagonal flange at the opposite end of the metallic element engaging a hexagonal recess in the non-metallic element for restraining relative axial and rotative movement therebetween.

RICHARD W. LUCE.

REFERENCES CITED

The following references are of record in the file of this patent:

UNITED STATES PATENTS

| Number | Name | Date |
|---|---|---|
| 2,102,489 | Simmonds | Dec. 14, 1937 |
| 154,851 | Dittman | Sept. 8, 1874 |
| 2,333,388 | Poupitch | Nov. 2, 1943 |